United States Patent [19]

Bailleux

[11] 3,905,881

[45] Sept. 16, 1975

[54] METHOD FOR PRODUCING HIGH-PURITY NICKEL FROM SULPHIDIZED CONCENTRATES

[75] Inventor: Michel Bailleux, Maurepas, France

[73] Assignee: Le Nickel, Paris, France

[22] Filed: Nov. 13, 1973

[21] Appl. No.: 415,338

[30] Foreign Application Priority Data

Nov. 13, 1972 France .............................. 72.40112

[52] U.S. Cl. ............... 204/113; 75/114; 75/101 BE
[51] Int. Cl.² ........................ C25C 1/08; C22B 3/00
[58] Field of Search ......... 204/113; 75/114, 101 BE

[56] References Cited
UNITED STATES PATENTS

| | | | |
|---|---|---|---|
| 3,085,054 | 4/1963 | Thornhill ........................... | 75/114 X |
| 3,669,649 | 6/1972 | Olson et al. ....................... | 75/114 X |
| 3,840,446 | 10/1974 | Gandon et al. .................... | 204/113 |

FOREIGN PATENTS OR APPLICATIONS

| | | | |
|---|---|---|---|
| 783,430 | 9/1972 | Belgium .......................... | 75/101 BE |

*Primary Examiner*—R. L. Andrews
*Attorney, Agent, or Firm*—Fleit & Jacobson

[57] ABSTRACT

In a method for the production of high-purity nickel from sulphide concentrates comprising successively the following steps: (a) drying and roasting near 900°C. said sulphide concentrate; (b) dissolving in hydrochloric acid the obtained product; (c) oxidizing the iron contained in the solution resulting from the preceding step; (d) eliminating the impurities on strongly basic anion-exchange resin of the quaternary ammonium type; (e) neutralizing the slight excess of hydrochloric acidity; and (f) electrolysing the nickel chloride solution purified in the preceding step, the improvement in which the iron oxidation step (c) is carried out by bubbling gaseous chlorine into the impure nickel chloride solution and thereafter adding to said solution sufficient hydrogen peroxide to bring the oxydo-reduction potential of said solution to the value which corresponds to the stoichiometric oxidation of the ferrous ions present in said solution.

5 Claims, No Drawings

METHOD FOR PRODUCING HIGH-PURITY NICKEL FROM SULPHIDIZED CONCENTRATES

The French Patent Application Ser. No. 71-18.633 describes a method for producing high-purity nickel from nickel matte, comprising the following steps: (a) drying and roasting at a temperature near 900°C said sulphide concentrate; (b) dissolving the product obtained in the preceding step, in hydrochloric acid; (c) oxidizing the iron content contained in the solution resulting from the preceding step; (d) eliminating the impurities on strongly basic anion-exchange resin of the quaternary ammonium type; (e) neutralizing the slight excess of hydrochloric acidity; and, (f) electrolysing the nickel chloride solution purified in the preceding step, the purification step being carried out by means of two sets of resin columns which are arranged in series and which are subjected in a cylic manner to regeneration by rinsing with hydrochloric acid, to elution with water, and to restoration to the former state by a solution of pure nickel chloride, whereby the elution solution of the first of said sets of resin columns is employed for the elution of the second of said sets, then admixed with hydrochloric acid, purified on a third set of columns containing anion-exchange resin, and used successively for rinsing the second one and the first one of said sets of resin columns.

This patent application mentions that the oxidation of the ferrous ions (step c) which are contained in the impure solution of nickel chloride can be carried out by bubbling air into this solution and adding to the solution hydrogen peroxide $H_2O_2$, whereby this addition of hydrogen peroxide is controlled by potentiometric titration in order to avoid any excess of this reagent.

Since the cost price of hydrogen peroxide is relatively high, studies have been carried out since the filing data of this patent application, aiming at means for carrying out this oxidation step on such a way that the chlorine produced during the electrolysis step (e) could be advantageously used.

An object of the present invention is consequently an improvement in the method described and claimed in the aforementioned French Patent Application and is characterized by the fact that the oxidation step (c) of said method is carried out by bubbling gaseous chlorine into the impure solution of nickel chlorine and consequently adding to the solution the amount of hydrogen peroxide which is necessary, either to make up the oxidizing effect of the chlorine with respect to the ferrous ions, or to reduce the excess of chlorine introduced into the solution.

In fact, the oxidizing effect of hydrogen peroxide is often used, but the method according to the present invention is based on a particular property of this reagent, namely the fact that hydrogen peroxide can act as a reducing product when used in the presence of an oxidizing agent, and in an acidic solution.

Consequently, the introduction of hydrogen peroxide into the impure solution of nickel chloride after an excess of chlorine has been bubbled into it, makes it possible to bring the oxydo-reduction potential of the solution to the value which corresponds with the stoichiometric oxidation of the ferrous ions, no excess of free chlorine being present in the solution.

The hydrogen peroxide is preferably introduced into the solution in the form of a diluted solution and the introduction of this reagent is advantageously controlled by potentiometric titration, as described in the aforementioned French patent application, in order to avoid any excess of hydrogen peroxide. In this manner, the obtained solution can be passed through a column of ion-exchange resin without damaging the resin, since the oxydoreduction potential of this solution presents a convenient value.

In a first embodiment of the improvement according to the present invention, an excess of chlorine is introduced into the impure solution of nickel chloride, and hydrogen peroxide is then added to the solution in order to reduce the excess of chlorine, which means that the amount of hydrogen peroxide added is such that the oxydo-reduction potential of the solution is brought back to the value which corresponds to the stoichiometric oxidation of the ferrous ions contained in the solution.

Those skilled in the art will readily understand that this value of the oxydo-reduction potential is easily determined in each case as a function of the amount of ferrous ions contained in the solution.

In another embodiment of the improvement according to the present invention, the amount of gaseous chlorine introduced into the impure solution of nickel chloride is smaller than the stoichiometric amount, and hydrogen peroxide is then added to the solution in order to complete the oxidizing effect of the chlorine.

As mentioned hereinbefore, the main advantage of the improvement according to the invention consists in the fact that the oxidation step of the method makes use of the gaseous chlorine which is produced during the electrolysis step. On the other hand, this improvement reduces notably the amount of expensive hydrogen peroxide which is necessary for adjusting the oxydo-reduction potential of the solution, as described hereinbefore.

The following examples have no limitative character, but will explain how the present invention can be carried out.

EXAMPLE I

The solution to be treated is an impure solution of nickel chloride which has been produced by treating impure nickel oxide by concentrated hydrochloric acid. This solution contains:

| | |
|---|---|
| Ni | 200g/l |
| Fe (total) | 5.3 g/l |
| $Fe^{++}$ | 1.4 g/l |

Gaseous chlorine is bubbled into this solution in an amount which is roughly estimated from the stoichiometric reaction of chlorine with the ferrous ions present in the solution. After this bubbling, a chemical analysis shows that the solution still contains 0.42 g/l of $Fe^{++}$.

A so-called "50 volumes" aqueous solution of hydrogen peroxide is then added to the impure solution of nickel chloride. The expression 50 volumes means that one liter of the aqueous solution of hydrogen peroxide can produce 50 liters of oxygen under normal temperature and pressure, according to the reaction:

$$H_2O_2 \rightarrow H_2O + \tfrac{1}{2} O_2$$

The slow addition of hydrogen peroxide brings the oxydo-reduction potential to about 750mV, which corresponds to the complete oxidation of the $Fe^{++}$ ions, without any excess of hydrogen peroxide.

EXAMPLE II

The same solution of nickel chloride as in Example I is oxidized by bubbling gaseous chlorine into it. When this bubbling is stopped, the oxydo-reduction potential of the solution is 950 mV, which means that too much chlorine has been bubbled.

A 50 volumes solution of hydrogen peroxide is then added and a continuous measurement of the oxydo-reduction potential shows that this potential decreases. The addition of hydrogen peroxide is stopped when the potential reaches a value of about 750 mV, which corresponds to the complete oxidation of the solution of nickel chloride, without any excess of chlorine.

What we claim is:

1. In a method for the production of high-purity nickel from a sulphide concentrate comprising the following successive steps:
    a. drying said sulphide concentrate and roasting it at a temperature of about 900°C., thereby producing sulfurous gas,
    b. dissolving the roasted product in hydrochloric acid,
    c. oxidizing the iron contained in the impure nickel chloride solution resulting from step (b),
    d. eliminating the impurities from the nickel chloride solution on a strongly basic anion-exchange resin of the quaternary ammonium type,
    e. neutralizing any excess hydrochloric acid, and
    f. electrolyzing the nickel chloride solution purified in the preceding steps thereby producing gaseous chlorine and high-purity nickel, said purification step (d) being carried out using two main sets of resin columns mounted in series, said main sets of resin columns being subjected in a cyclic manner to regeneration by rinsing them with hydrochloric acid, by eluting them with water, and by restoring them to their former state using a solution of pure nickel chloride, and in which the elution solution of the first of said sets of resin columns is used for the elution of the second of said sets, then admixed with hydrochloric acid, purified on an auxiliary set of columns containing anion-exchange resin and then used successively for rinsing the second one and then the first one of said main sets of resin columns, the improvement comprising carrying out the iron oxidation step (c) by bubbling gaseous chlorine into said impure nickel chloride solution and thereafter adding sufficient hydrogen peroxide to said impure solution to bring the oxydo-reduction potential of said impure solution to the value which corresponds to the stoichiometric oxidation of the ferrous ions present in said impure solution.

2. The method of claim 1 in which an excess of gaseous chlorine is bubbled into said nickel chloride solution.

3. The method of claim 1 in which an amount of gaseous chlorine smaller than the stoichiometric amount is bubbled into said impure nickel chloride solution.

4. The method of claim 1 in which the amount of hydrogen peroxide added to said impure solution is controlled by potentiometric measurements.

5. The method of claim 1 in which the gaseous chlorine released during the electrolysis step (f) is used as the source of chlorine for oxidizing said iron.

* * * * *